(12) United States Patent
Hewinson

(10) Patent No.: US 9,419,980 B2
(45) Date of Patent: *Aug. 16, 2016

(54) LOCATION-BASED SECURITY SYSTEM FOR PORTABLE ELECTRONIC DEVICE

(71) Applicant: Google Inc., Mountain View, CA (US)

(72) Inventor: Phil Hewinson, London (GB)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/530,871

(22) Filed: Nov. 3, 2014

(65) Prior Publication Data

US 2015/0052133 A1 Feb. 19, 2015

Related U.S. Application Data

(63) Continuation of application No. 13/617,385, filed on Sep. 14, 2012, now Pat. No. 8,881,263, which is a continuation of application No. 13/398,949, filed on Feb. 17, 2012, now Pat. No. 8,302,152.

(51) Int. Cl.
*H04L 29/06* (2006.01)
*G06F 21/00* (2013.01)
*G06F 21/31* (2013.01)
*G06F 17/30* (2006.01)

(52) U.S. Cl.
CPC .......... *H04L 63/10* (2013.01); *G06F 17/30241* (2013.01); *G06F 21/31* (2013.01); *G06F 2221/2111* (2013.01)

(58) Field of Classification Search
CPC . H04L 63/1466; H04L 63/0876; H04L 63/10; G06F 17/30241; G06F 21/31; G06F 2221/2111
See application file for complete search history.

(56) References Cited

U.S. PATENT DOCUMENTS

| | | | |
|---|---|---|---|
| 6,216,007 B1 * | 4/2001 | Havinis et al. | 455/456.2 |
| 6,654,860 B1 | 11/2003 | Strongin et al. | |
| 6,687,504 B1 | 2/2004 | Raith | |
| 7,177,426 B1 | 2/2007 | Dube | |
| 7,577,847 B2 | 8/2009 | Nguyen et al. | |
| 7,904,063 B1 | 3/2011 | Steelberg et al. | |

(Continued)

FOREIGN PATENT DOCUMENTS

| | | |
|---|---|---|
| CN | 102272767 A | 12/2011 |
| EP | 2530962 A1 | 12/2012 |

OTHER PUBLICATIONS

Notification of First Office Action for CN 201210429160.9, dated Jan. 21, 2014.

(Continued)

*Primary Examiner* — Lisa Lewis
(74) *Attorney, Agent, or Firm* — Morris & Kamlay LLP

(57) ABSTRACT

A location-dependent security method and system for a portable electronic device is disclosed. Without requiring that the user enter any location information, the system determines one or more familiar areas for the device based on locations where the device has received at least a threshold amount of successful user authentication entries. Thereafter, when a user attempts to access the device or an application of the device, the device will implement a first authentication process if the device is in one of the familiar areas, or a different authentication process if the device is not in one of the familiar areas.

14 Claims, 3 Drawing Sheets

(56) References Cited

U.S. PATENT DOCUMENTS

| | | | |
|---|---|---|---|
| 8,510,041 B1* | 8/2013 | Anguelov et al. | 701/445 |
| 8,560,539 B1 | 10/2013 | Engebretsen | |
| 9,177,125 B2* | 11/2015 | Steeves | G06F 21/31 |
| 2003/0112182 A1 | 6/2003 | Bajikar | |
| 2005/0278371 A1* | 12/2005 | Funk et al. | 707/102 |
| 2007/0110009 A1* | 5/2007 | Bachmann et al. | 370/338 |
| 2008/0256097 A1* | 10/2008 | Messer et al. | 707/100 |
| 2009/0055088 A1* | 2/2009 | Zhang et al. | 701/201 |
| 2009/0254975 A1* | 10/2009 | Turnbull et al. | 726/3 |
| 2010/0017874 A1 | 1/2010 | Piccinini et al. | |
| 2010/0175116 A1* | 7/2010 | Gum | 726/6 |
| 2010/0211997 A1 | 8/2010 | Mcgeehan et al. | |
| 2011/0050503 A1* | 3/2011 | Fong et al. | 342/451 |
| 2011/0053559 A1 | 3/2011 | Klein | |
| 2011/0105073 A1* | 5/2011 | Hassan et al. | 455/334 |
| 2011/0154434 A1* | 6/2011 | Hernacki | 726/1 |
| 2011/0167440 A1* | 7/2011 | Greenfield | 725/25 |
| 2011/0313657 A1* | 12/2011 | Myllymaki et al. | 701/208 |
| 2012/0036132 A1* | 2/2012 | Doyle | 707/738 |
| 2012/0058782 A1* | 3/2012 | Li | 455/456.2 |
| 2012/0171989 A1* | 7/2012 | Matsuo et al. | 455/404.2 |
| 2012/0304260 A1* | 11/2012 | Steeves et al. | 726/5 |
| 2014/0002375 A1* | 1/2014 | Rydenhag et al. | 345/173 |
| 2014/0080410 A1* | 3/2014 | Jung et al. | 455/41.1 |

OTHER PUBLICATIONS

Wikiepdia: "Cluster analysis" Jan. 28, 2012 pp. 1-13. retrieved from the Internet: URL:http://en.wikipedia.org/w/index.php?title=Ciuster_analysis&oldid=473745370, retrieved on Mar. 5, 2013.

* cited by examiner

LOCATION-BASED SECURITY SYSTEM FOR PORTABLE ELECTRONIC DEVICE

RELATED APPLICATIONS AND CLAIM OF PRIORITY

This patent document claims priority to U.S. patent application Ser. No. 13/398,949, filed Feb. 17, 2012, titled "Location-Based Security System for Portable Electronic Device," the disclosure of which is hereby incorporated by reference in its entirety.

BACKGROUND

Portable electronic devices, such as smart phones, personal digital assistants, laptop computers, tablet computing devices, media players and the like typically employ security settings that enable the device to be locked until a user is authenticated to the device. Authentication methods typically include the entry of a passcode. Some devices may include a biometric authentication means such as a fingerprint entry, but such features can add to the cost of the device. Thus, passcodes remain the most common form of authentication.

While passcode authentication is convenient and simple from an end-user perspective, some users object to repeatedly entering passwords into electronic devices, and such users may disable security features rather than be bothered with password entry at all. This leaves the device unsecure, and it exposes the user's data to be taken by others.

This document describes improved methods for securing a portable electronic device.

SUMMARY

In an embodiment, a portable electronic device receives a request to access the electronic device. The access request may be an overall access request, such as the press of a button or touch screen to wake the device from a locked state. Or it may be another request such as a request to access a particular application or function on the electronic device. Without requiring that the user enter any location information, the device's processor may determine a familiar area for the electronic device, and it will determine whether or not the device is located in the familiar area. If the device is located in the familiar area, it will implement a first security rule requiring a first authentication process. On the other hand, if the device is not located in the familiar area the device will implement a second security rule requiring a second authentication process. The second security rule may be more complex, or require more time, than the first security rule. The device may determine its current location and present the user with a prompt to perform: (i) the first authentication process if the device is in a familiar location; or (ii) the second authentication process if the device is not within a familiar location.

Optionally, the device may automatically determine a second familiar area without a requirement for user entry of location information. If so, it may implement a third authentication process when the device is located in the second familiar area.

To determine the familiar areas, the device may consider data representative of successful user authentication entries and each entry's corresponding location. For example, when the device receives successful user authentication entries, it may determine a device location for each successful user authentication entry and save data representative of each successful entry and its corresponding location in a computer-readable memory. Determining the location of the device may include receiving global positioning system (GPS) data and determining the location based on the GPS data, receiving a network address corresponding to a wireless communications network that the device is using and determining the location based on the network address, or other methods. If the memory contains at least a threshold number of entries for a location, the processor may classify that location as a familiar area.

Alternatively, familiar areas may be determined by determining a set of successful user authentication entries that were received during a time period, grouping the entries from the set into location-dependent subsets, determining a size of the set and a size of each subgroup, and identifying each subgroup that has a size which at least equals a size threshold that corresponds to a portion of the set size. For each subgroup having a size that at least equals the size threshold, the device may classify the location for that subgroup's entries as the familiar area. Grouping the entries from the set into location-dependent subsets may include identifying entries having locations that are within a threshold distance from each other, and grouping the identified entries into one of the subgroups.

As another alternative, determining a familiar area may include automatically and periodically gathering location information for the device, saving the location information in a memory, accessing the saved location information and automatically determining a location for which the location information is saved in the memory in at least a threshold amount, and setting the determined location as the familiar area.

As another alternative, determining a familiar area may include automatically and periodically gathering location information for the device, wherein the location information includes GPS data and wireless network data, identifying a position where the device transitions (or frequently or repeatedly transitions in a time period) from a global positioning system to a single wireless network, and setting the determined position as the familiar area.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to." As used in this document, the terms "sum," "product" and similar mathematical terms are construed broadly to include any method or algorithm in which a single datum is derived or calculated from a plurality of input data.

For the purposes of this document, a "passcode" refers to any input that may be used to authenticate a user of an electronic device. For example, a passcode may include a sequence of characters such as letters, numbers, icons or other symbols, voice prompts or other characters that may be used to authenticate a user requesting access to an electronic device. Alternative, a passcode may include a biometric identifier, such as a fingerprint recognition or a facial recognition technology.

Figure 1:
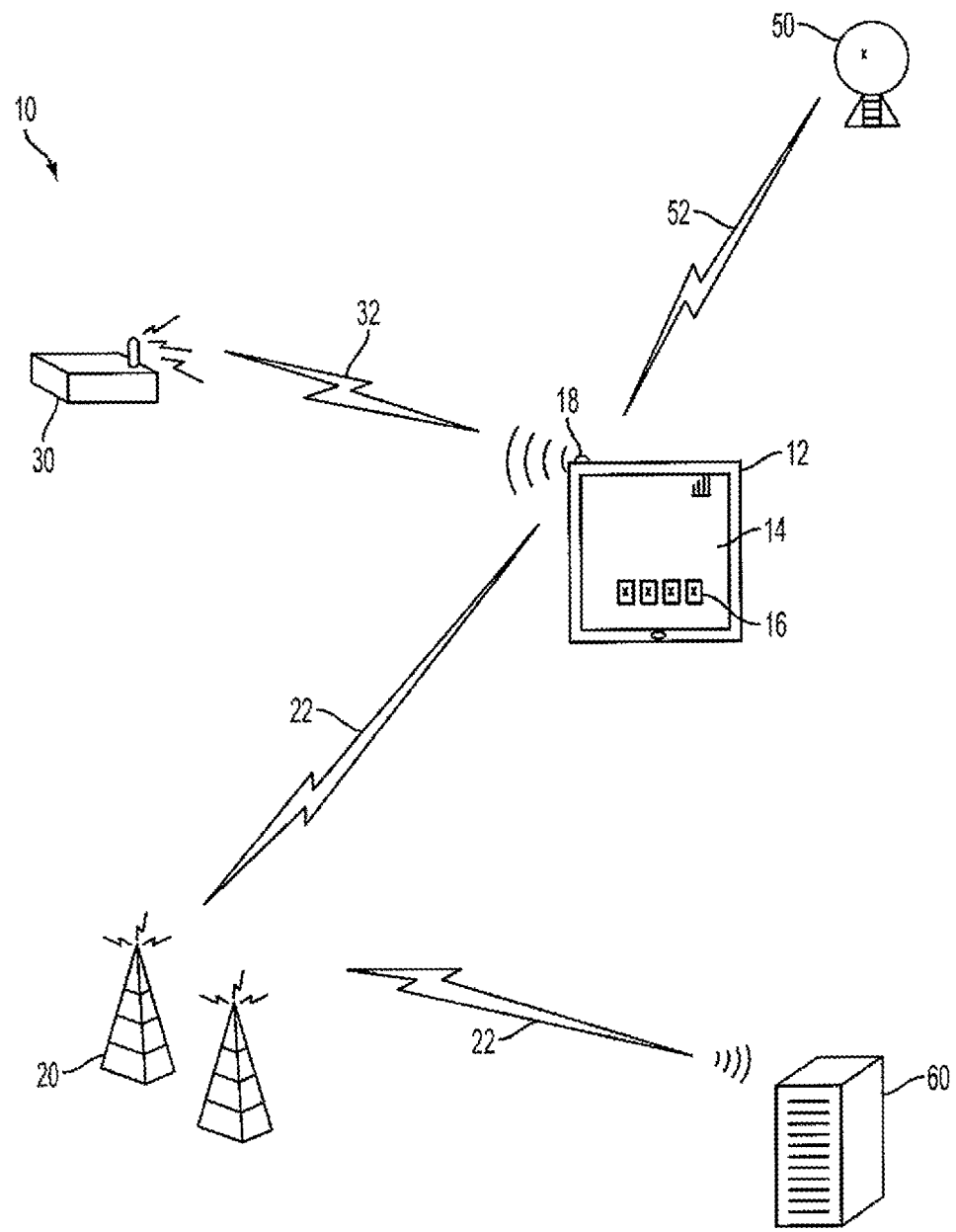
FIG. 1 illustrates a system that may be used to determine a location of a portable electronic device.

FIG. 1 illustrates a system 10 that may be used to for providing a location-based security function on a portable electronic device 12. In this document, a "portable electronic device" refers to an electronic device that includes a processor; a tangible, computer-readable memory; and a communications link 18 such as a transceiver or communications port that enables the device to send and receive signals via one or more wireless communications networks. Portable electronic devices may include, for example smart phones, personal digital assistants, laptop computers, tablet computing devices, media players and the like. The electronic device 12 may include a display 14 and one or more input sensors 16 such as touch screen elements of a display and/or buttons, keys, switches or the like.

The electronic device 12 may send and receive data via one or more communications networks 32, 22. For example, one or more transmission towers 20 may relay data and/or voice signals to the device via a wireless network 22. A wi-fi network 32 or similar hotspot may send and receive signals from a router 30 or similar device. A satellite 50 may send or receive signals 52 such as global positioning system (GPS) location data to and from the device. Optionally, a server 60 may be in communication with one or more of the networks so that it sends and/or receives information to and/or from the device.

Many existing electronic devices are configured to automatically enter a secured, or locked, state when not in use for specific amounts of time. The user may then be required to perform an authentication process in order to transition the device from the secured state (in which the user cannot use the device) to an insecure state (in which the user may use the device and access the device's functions). Examples of authentications processes include the entry of passcodes, facial recognition methods, voice recognition patterns, gestures, and other now or hereafter known authentication technologies. For example, the device may include a display such as a touch screen with a touch-sensitive field 14 on which the user must swipe or place his or her finger. The authentication required by the touch-sensitive field may simply be a swipe of the finger, or it may be a biometric recognition technology such as a fingerprint reader. The display or a keypad of the device may accept an authentication code such as personal identification number (PIN) or passcode. An audio input such as a microphone may accept an authentication such as by a voice-entered passcode or PIN. An image sensor such as a camera. may capture an image of the user so that the device can perform facial recognition. A near field communications (NFC) sensor may detect when the device is in the communication range of a token than emits a passcode via NFC signal. Any or all of these authentication methods will be implemented by programming instructions that are stored in a memory and used by the processor of the electronic device, or by a processor of a remote server that is in electronic communication with the electronic device via a wireless or wired communication network.

In addition to varying authentication methods, the amount of time required before a device moves from a secured state to an insecure state may vary by device. Users of electronic devices generally do not like very short lock timeouts because the user must re-enter his or her password or other authentication very frequently. On the other hand, if the device has a longer timeout before moving from an insecure to a secure state, the device will be unprotected during this time. The methods described below may assist a user by providing the user with a simpler authentication process when the device is in a location where the user typically takes the phone, such as the user's home or office. A more complex authentication process may be required when the smartphone is not located in a known safe area.

Figure 2:
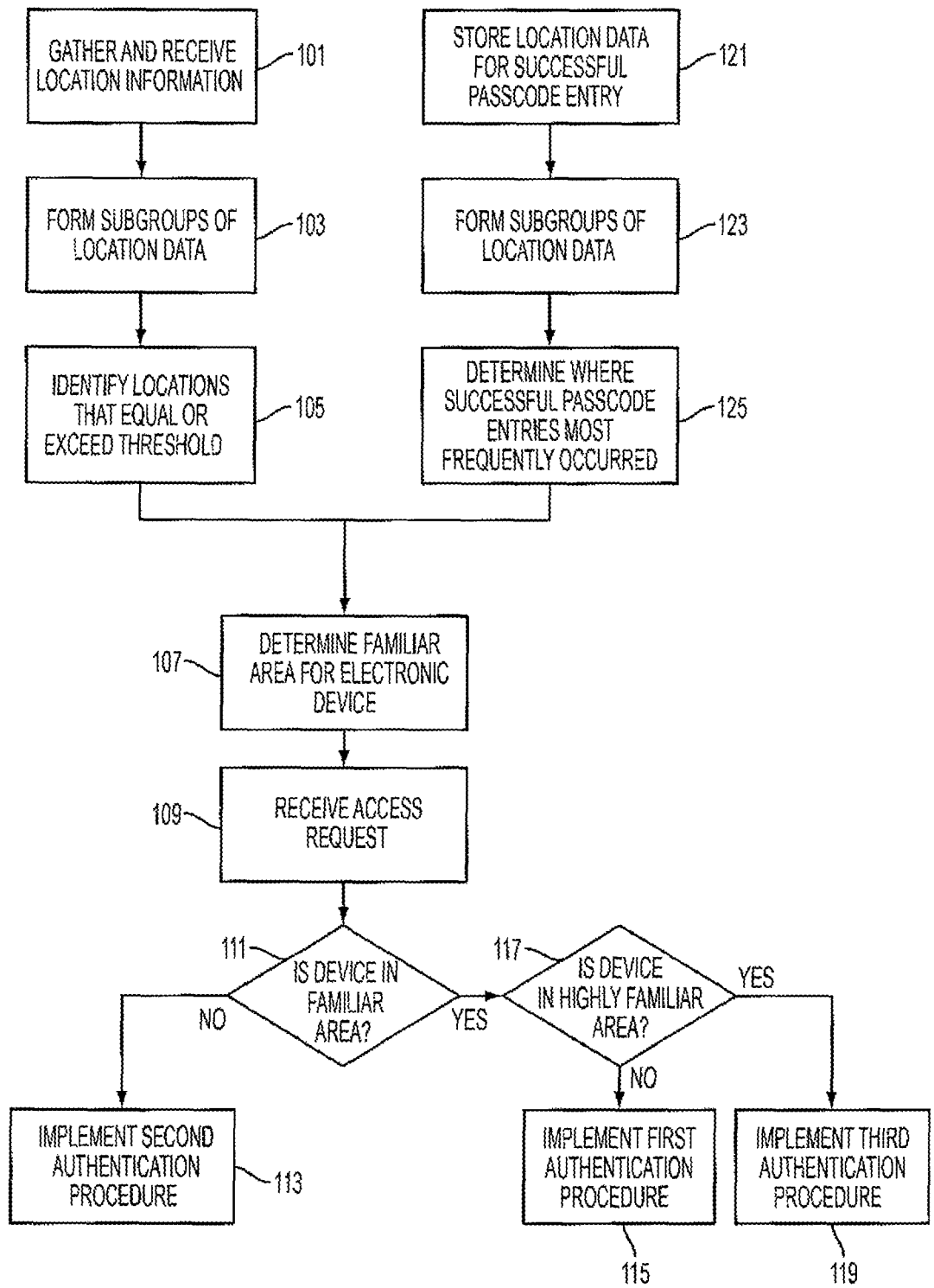
FIG. 2 is a flowchart describing elements of an example of an authentication by location process.

FIG. 2 illustrates a process that may be used to implement a location-based security system for an electronic device. The device may implement programming instructions to automatically determine a familiar area of the device. The determination of a familiar area may be performed without any requirement or consideration of user-entered location information. Instead, the system may determine the familiar location through some combination of global positioning system (GPS) data, network identification information, successful passcode entry data, and/or other data.

For example, the device may be programmed to automatically gather location information for the device 101, such as by retrieving GPS location data or a network address, and saving the location information in a memory. In addition to gathering the location information for a network that the device is using, the device may gather location information for one or more other networks that are in range of the device and which the device detects. The gathering may occur periodically, such as after the passage of a certain number of minutes. Alternatively, the gathering may be prompted by the occurrence of an event, such as a successful authentication event, the change of the device from an unlocked state to a locked state, the launching of an application, or some other action.

The processor may access the saved location information and automatically determine a familiar location to be any location for which the location information is saved in the memory in at least a threshold amount 105. The threshold amount may be, for example, a threshold number of locations detected over a recent period of time, a total threshold level, or a threshold percentage of all locations that are saved to the memory over an immediately preceding period of time. For example, the system may gather and save location information on an hourly basis and save the information in memory for 5 days. As new location information is gathered, the oldest information may be purged from the memory. When the device analyzes the data, it may determine that any location (e.g., GPS data or network address) that makes up at least 15 percent of the stored data corresponds to a familiar location for the user 105. Alternatively, the device may use a most frequent places threshold, such as a number of (e.g., top five) locations that each correspond to more stored data than any other location. Other thresholds and time periods are possible.

In addition, multiple thresholds may be required in order for a location to be classified as a familiar location. For example, to be familiar, a location may be required to correspond to ten percent of the stored data and be ranked as a top five location among all locations in the stored data. As another variation, the thresholds may vary depending on the particular combination. For example, a familiar location may one that makes up ten percent of the data and ranked as number 1-5, but a five percent data threshold may apply if the location is in rank numbers 6-10.

Alternatively, the device may determine familiar areas based on the locations at which a user has repeatedly entered multiple successful user authentication entries. For example, whenever the device receives a successful authentication entry, it may store data corresponding to the location at which the entry was received 121. The location data may be GPS data, network address data, or any other information that provides evidence of location of the device. The location data may be stored with a time stamp or other time-based indication and purged after a period of time. Alternatively, the data may simply be stored in the order in which it was received, and purged when a threshold number of entries are in the memory. For example, the device may store location data for the 50 most recent successful passcode entries, with the oldest entry deleted when a new entry is received. The device may then determine the locations where successful authentication entries most frequently occurred 125, such as by determining locations where at least a threshold number of successful authentications occurred or by determining locations where at least a threshold percentage (e.g., 20 percent.) of the successful authentication code entries occurred. The system may then determine familiar areas 107 to be those where successful authentication entries were most frequent, such as those where one or both of the thresholds were equaled or exceeded.

It is possible that a single "familiar area" will correspond to more than one GPS location data point or more than one network address. For example, an office complex may have a range of GPS coordinates. Thus, when determining familiar areas the system may group the successful entries into one or more location-dependent subgroups 103, 123; determine a size of the overall set of successful entries and a size of each subgroup; identify each subgroup having a size that at least equals a size threshold that corresponds to a known fraction, percentage or other portion of the set size; and classify the location of each subgroup having a size that at least equals the size threshold as the familiar area. Subgroups may be made by grouping entries having locations that are within a threshold distance from each other, such as 20 meters or some other distance. For example, a user's office may have multiple GPS coordinates, or it may use multiple wi-fi networks, depending on where in the office the user is located. By grouping areas that are in close proximity to each other into subgroups, each subgroup can be analyzed to determine whether it makes up a familiar area. Close proximity may be those that are determined to be within a threshold distance from each other, such as by UPS data, known network locations or other information.

In some embodiment, determining a familiar area 107 may include identifying a position where the device transitions from one network to another. This may indicate, for example, that the device transitions from a cellular network (indicating that the device is outdoors) to using a known wi-fi network (indicating that the device has moved indoors, perhaps to the user's office). Alternatively, the device may move from a location where no known networks are detected into an area where at least one known network is detected. If this happens, or if it happens repeatedly at least a threshold number of times within a known time period, the device may record the wi-fi network into which the device transitions as a familiar area.

When the device is in a secured state, such as being locked out so that a passcode must be entered before a user can access any or all of the device's applications or features, the device may receive a request to access the electronic device 109. The access request may be a swipe on the device's touch screen, a press of a button, a voice command, or any other detected input from a user.

In response to the access request, the device may compare current GPS, network address or other data to the stored familiar locations to determine whether the device is physically located in a familiar area 111. If the device is in a familiar area, it may implement a security rule requiring a first authentication procedure 115. If the device is not located in familiar area, it may implement a second security rule requiring a second authentication procedure 113. The device may then present the user with a prompt to perform the applicable authentication process. The determination of whether or not the device is in a familiar area may be done automatically, without any requirement of user input, or even without presenting the result of the determination to the user.

The first authentication process 115, which corresponds to the familiar area, may be less complex or less burdensome than the second process 113. For example, the first process may have a longer timeout period than the second process, meaning that the device will remain in an unsecured state for a longer period of time if it is in the familiar area. As another example, the first authentication process may require a shorter passcode, or no passcode at all and merely a touch input such as a finger swipe, or a voice prompt, if it is in a familiar area. As another option, the second authentication process may require more actions than the first process. For example, the first authentication process may require entry of a passcode, while the second authentication process may require both entry of a passcode and detection of a known token such as an NFC chip within range of the electronic device.

In some embodiments, different authentication processes may be authorized for different familiar areas. For example, the system may determine whether the device is in a highly familiar area 117 by determining whether it is in an area where the device is most frequently present. In addition, when determining familiar areas the system may rank the familiar areas such as by considering any area in which the device is present more than an upper threshold, such as 20% of the time, as "highly familiar", while considering any area in which the device is present at or below the upper threshold but above a lower threshold as "familiar." The authentication process tier a highly familiar area may be a third authentication procedure 119 that is even less complex or less burdensome than the first process. For example, the third process may have a timeout period that is longer than that of the first and the second processes, or it may have no timeout period at all.

Figure 3:
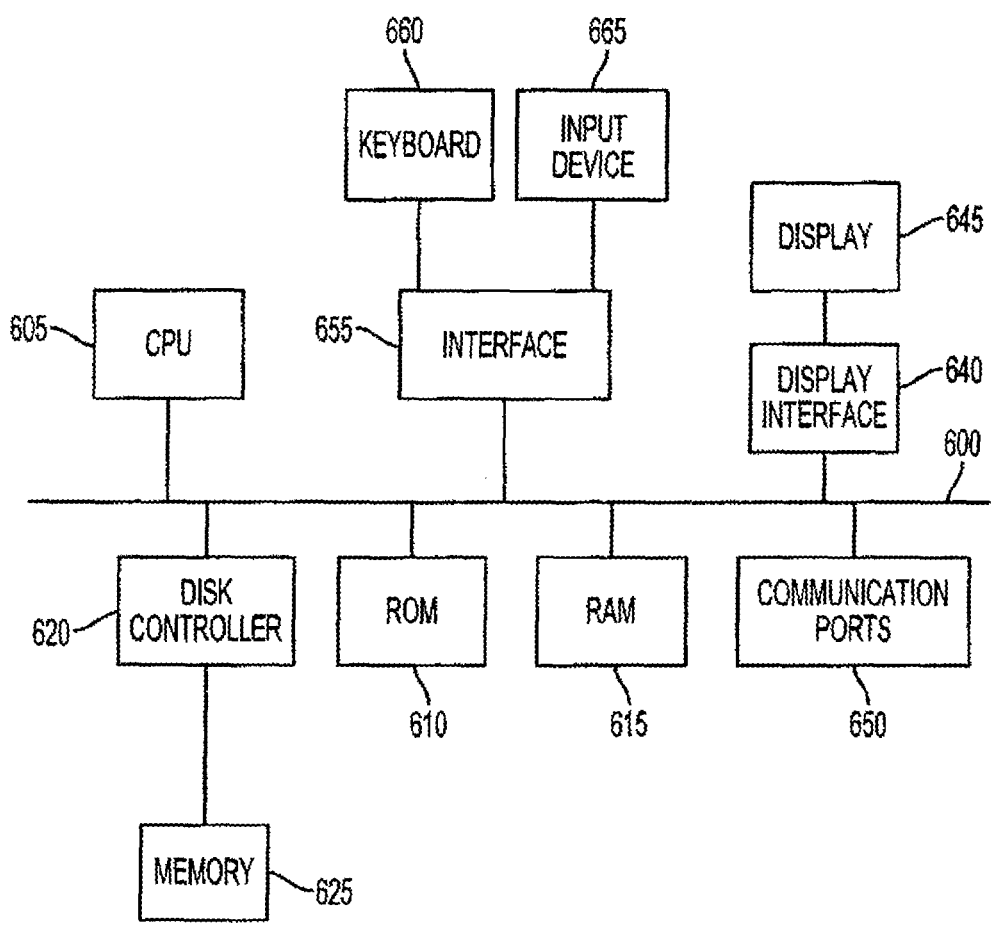
FIG. 3 is a block diagram of hardware that may be used to contain or implement program instructions according to an embodiment.

FIG. 3 is a block diagram of exemplary hardware that may be used to contain or implement program instructions according to an embodiment. A bus 600 serves as the main information pathway interconnecting the other illustrated components of the hardware. CPU 605 is the central processing unit of the system, performing calculations and logic operations required to execute a program. Read only memory (ROM) 610 and random access memory (RAM) 615 constitute exemplary memory devices.

A controller 620 interfaces with one or more optional memory devices 625 to the system bus 600. These memory devices 625 may include, for example, an external or internal DVD drive, a CD ROM drive, a hard drive, flash memory, a USB drive or the like. An indicated previously, these various drives and controllers are optional devices.

Program instructions may be stored in the ROM 610 and/or the RAM 615. Optionally, program instructions may be stored on a tangible computer readable storage medium such as a hard disk, compact disk, a digital disk, flash memory, a memory card, a USB drive, an optical disc storage medium, such as a Blu-ray™ disc and/or other recording medium.

An optional display interface 640 may permit information from the bus 600 to be displayed on the display 645 in audio, visual, graphic or alphanumeric format. Communication with external devices may occur using various communication ports 650. A communication port 650 may be attached to a communications network, such as the Internet or an intranet.

The hardware may also include in interface 655 which allows for receipt of data from input devices such as a keyboard 660 or other input device 665 such as a mouse, a joystick, a touch screen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

What is claimed is:

1. A method, comprising:
   receiving, via an input of a portable electronic device, a request to access the electronic device;
   automatically determining, by a processor without a requirement for user entry of location information, a first familiar area for the electronic device by:
      gathering wireless communications network address data that the electronic device detects when a user is successfully authenticated by the electronic device,
      saving the gathered network address data in a computer-readable memory, and
      classifying a first location as the first familiar area when the network address data corresponding to the first location has been saved a first threshold number of times and has exceeded at least one other threshold parameter relative to other locations indicated by the saved network address data; and
      implementing, on the electronic device, a first lockdown rule having a first timeout period when the portable electronic device is located in the first familiar area and a second lockdown rule having a second timeout period when the portable electronic device is located outside of any familiar area.

2. The method of claim 1, wherein determining that the network address data corresponding to the first location has been saved a first threshold number of times comprises determining that the network address data corresponding to the first location makes up at least a pre-determined percentage of the saved network address data.

3. The method of claim 1, wherein the periodic gathering of the network address data is based on a launching of an application.

4. The method of claim 1, wherein the periodic gathering of the network address data is based on a change of the portable electronic device from an unlocked state to a locked state.

5. The method of claim 1, wherein classifying the first location as the first familiar area does not occur until the network address data corresponding to the first location has satisfied the first threshold and a second threshold factor.

6. The method of claim 1, further comprising:
   determining that network address data corresponding to a second location has been saved a second threshold number of times;
   classifying the second location as a first highly familiar area; and implementing, on the electronic device, a third lockdown rule having a third timeout period when the portable electronic device is located in the first highly familiar area, wherein the third lockdown rule is different from the first and second lockdown rules.

7. The method of claim 1, wherein the at least one other threshold parameter is a rank above a first threshold in a listing of locations stored in the computer-readable memory ranked according to frequency.

8. The method of claim 1, wherein the at least one other threshold parameter is a threshold percentage of all locations that are saved to the memory over an immediately preceding period of time.

9. A system, comprising:
   a processor, and
   a computer-readable memory having programming instructions that, when executed, instruct the processor to:
      receive wireless communications network address data that a portable electronic device detects when a user is successfully authenticated by the portable electronic device,
      save the received network address data in a computer-readable memory,
      classify, without a requirement for user entry of location information, a first location as a first familiar area when network address data corresponding to the first location has been saved a first threshold number of times and has exceeded at least one other threshold parameter relative to other locations indicated by the saved network address data; and
      implement a first lockdown rule having a first timeout period when the portable electronic device is located in the first familiar area and a second lockdown rule having a second timeout period when the portable electronic device is located outside of any familiar area.

10. The system of claim 9, further comprising additional programming instructions that, when executed, instruct the processor to determine that the network address data corresponding to the first location has been saved a first threshold number of times by determining that the network address data corresponding to the first location makes up at least a pre-determined percentage of the saved network address data.

11. The system of claim 9, further comprising additional programming instructions that, when executed, instruct the processor to receive the network address data based on a launching of an application.

12. The system of claim 9, further comprising additional programming instructions that, when executed, instruct the processor to receive the network address data based on a change of the portable electronic device from an unlocked state to a locked state.

13. The system of claim 9, further comprising additional programming instructions that, when executed, instruct the processor to classify the first location as the first familiar area after the network address data corresponding to the first location has satisfied the first threshold and a second threshold factor.

14. The system of claim 9, further comprising additional programming instructions that, when executed, instruct the processor to:
   determine that network address data corresponding to a second location has been saved a second threshold number of times;
   classify the second location as a first highly familiar area; and implement, on the electronic device, a third lockdown rule having a third timeout period when the portable electronic device is located in the first highly familiar area.

* * * * *